(12) United States Patent
Payne et al.

(10) Patent No.: US 10,712,194 B2
(45) Date of Patent: *Jul. 14, 2020

(54) FLUID LEVEL SENSOR

(71) Applicant: Medallion Instrumentation Systems, LLC, Spring Lake, MI (US)

(72) Inventors: Martin Payne, Spring Lake, MI (US); Philip J. VanderWall, Marne, MI (US)

(73) Assignee: Medallion Instrumentation Systems, LLC, Spring Lake, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,024

(22) Filed: Sep. 9, 2019

(65) Prior Publication Data

US 2020/0003605 A1 Jan. 2, 2020

Related U.S. Application Data

(63) Continuation of application No. 15/289,406, filed on Oct. 10, 2016, now Pat. No. 10,408,666.

(Continued)

(51) Int. Cl.
*G01F 23/72* (2006.01)
*G01F 23/00* (2006.01)
(Continued)

(52) U.S. Cl.
CPC ............ *G01F 23/72* (2013.01); *G01D 5/145* (2013.01); *G01F 23/0069* (2013.01); *G01F 23/0076* (2013.01); *G01F 23/76* (2013.01)

(58) Field of Classification Search
CPC .. G01F 23/72; G01F 23/0069; G01F 23/0076; G01D 5/145
(Continued)

(56) References Cited

U.S. PATENT DOCUMENTS 4,361,835 A 11/1982 Nagy
5,103,673 A 4/1992 Sawada et al.
(Continued)

OTHER PUBLICATIONS

Felton, B., "Level measurement: Ancient chore, modern tools", InTech, 48(8), Aug. 2001, pp. 73-74.
(Continued)

*Primary Examiner* — Tarun Sinha
(74) *Attorney, Agent, or Firm* — Warner Norcross + Judd LLP

(57) ABSTRACT

A fluid sensor system capable of sensing a fluid level or a volume of fluid held by a reservoir, such as a container or a tank. In one embodiment, the system may include a magnetic element in a flotation device that suspends the magnetic element in the fluid held by the reservoir, so that the magnetic element randomly floats in proximity to a top of the fluid surface. Two or more magnetic field sensors or magnetometers are associated with the reservoir in at least two different locations, spaced apart from one another. The system further includes a processor coupled to the sensors. The magnetic field sensors may sense the strength of the magnetic field around the magnetic element to generate signals that are sent to the processor. The processor may then determine the location of the magnetic element within the reservoir based on the signals. The determined location can be correlated to a volume of fluid within the tank which is output to another device and/or a user.

20 Claims, 4 Drawing Sheets

Related U.S. Application Data

(60) Provisional application No. 62/240,860, filed on Oct. 13, 2015.

(51) Int. Cl.
  *G01D 5/14* (2006.01)
  *G01F 23/76* (2006.01)

(58) Field of Classification Search
  USPC .......................................................... 73/291
  See application file for complete search history.

(56) References Cited

U.S. PATENT DOCUMENTS

| | | | |
|---|---|---|---|
| 5,347,864 A | 9/1994 | Senghaas et al. | |
| 5,829,303 A | 11/1998 | Fraser | |
| 6,065,336 A | 5/2000 | Liang | |
| 6,084,406 A | 7/2000 | James et al. | |
| 6,418,788 B2 | 7/2002 | Articolo | |
| 6,502,461 B2 | 1/2003 | Keller | |
| 6,508,119 B2 | 1/2003 | Beck, II | |
| 6,813,946 B1 | 11/2004 | Benton | |
| 6,876,822 B2 | 4/2005 | Sasaki et al. | |
| 8,450,998 B2 | 5/2013 | Reabe | |
| 8,549,911 B2 | 10/2013 | Rudd et al. | |
| 8,763,455 B1 | 7/2014 | Chang | |
| 10,408,666 B2 * | 9/2019 | Payne | G01D 5/145 |
| 2001/0032506 A1 * | 10/2001 | Keller | G01F 23/38 |
| | | | 73/313 |
| 2002/0129650 A1 | 9/2002 | Zimmerman et al. | |
| 2002/0194910 A1 | 12/2002 | Schelhas et al. | |
| 2010/0001867 A1 | 1/2010 | Rodrigue et al. | |
| 2010/0229964 A1 | 9/2010 | Ross, Jr. et al. | |
| 2012/0152016 A1 | 6/2012 | Prinstil et al. | |
| 2014/0096603 A1 * | 4/2014 | Nichols | G01F 23/30 |
| | | | 73/305 |
| 2017/0074714 A1 | 3/2017 | Aschenbrenner | |
| 2017/0102261 A1 | 4/2017 | Payne et al. | |

OTHER PUBLICATIONS

"Switch Tips: Float-level switches", Machine Design, v 76, n 17, Sep. 2, 2004, p. 50.

Triaxis: Position Sensing Solution, downloaded from https://www.melexis.com/en/articles/triaxis and available at least as of Sep. 14, 2016.

* cited by examiner

FLUID LEVEL SENSOR

TECHNICAL FIELD

The present application relates to a fluid level sensor, and more particularly to a field-based fluid level sensor system.

BACKGROUND

Fluid level sensors are used in a variety of applications that involve detecting a level of fluid within a container. One application of growing significance is in the field of fuel senders for fuel tanks in vehicles. In a conventional arrangement, a fuel sender, more generally known as a type of fluid level sensor, can be disposed within a fuel tank, and may include a float that is mechanically coupled to a main body of the sender unit and that rises and falls along with the fuel level in the container. The float may be rotatably coupled to the main body via a float arm whose angular position corresponds to the float position and therefore the fluid level in the container. Conventionally, an electrical or actively powered sensor is placed within the container as part of the fuel sender and along with the float to sense the angular position of the float arm. Examples of such active sensors include rheostat sensors and inductive-based sensors. Such a sensor is conventionally powered via wiring or an electrical connection, or both, by a power supply external to the container. As a result, installation and use of the fuel sender involves providing power to components (e.g., the electronic sensor) within the container. Further, installation and use of the fuel sender also involves disposing mechanical as well as electrical components within the container, thereby increasing the complexity of installation and any potential repair efforts.

Incorporation of electrical components and providing power thereto into a container can present several design considerations. Conventionally, if the fluid being stored in the container is corrosive or generally reactive, the fuel sender is constructed such that the electrical components and associated electrical conductors are sealed from the fluid by non-reactive materials. Such a construction, including use of such non-reactive materials, can increase the cost and complexity of the fuel sender.

Another design consideration with respect to use of electrical components within a fluid container includes limiting or constraining the voltage or current, or both, supplied to the electrical components. In this way, the power supply may be limited to substantially avoid ignition of potentially flammable vapor within the container. Component selection of the fuel sender is often driven by these considerations.

SUMMARY OF THE DESCRIPTION

The current embodiments provide a fluid sensor system capable of sensing a fluid level or a volume of fluid held by a reservoir, such as a container or a tank.

In one embodiment, the system may include a magnetic element having a flotation device that suspends the magnetic element in the fluid held by the reservoir, so that the magnetic element randomly floats in proximity to a top of the fluid surface. Two or more magnetic field sensors, optionally magnetometers, are associated with the reservoir in at least two different locations, spaced apart from one another. The system further includes a processor coupled to the sensors. The magnetic field sensors may sense the strength of the magnetic field around the magnetic element to generate signals that are sent to the processor. The processor may then determine the location of the magnetic element within the reservoir based on the signals. The determined location can be correlated to a volume of fluid within the tank which is output to another device and/or a user.

In another embodiment, the processor may triangulate the location or position of the magnetic element within the reservoir based on one or more signals sensed by one or more magnetic field sensors. The magnetic field strength in proximity to each of the one or more magnetic field sensors may vary based on the distance between each respective magnetic field sensor and the magnetic element. The processor may be coupled to memory that stores instructions relating to a functional relationship between the magnetic field strength sensed by the one or more magnetic field sensors and fluid level or volume of fluid held by the reservoir. The functional relationship may account for variations in movement of the flotation device on or adjacent a surface of the fluid so that such movement does not affect a determined fluid level based on the sensed magnetic field strengths. As an example, the processor may be determine the location of the flotation device by calculating angles, based on output from the one or more magnetic field sensors, relative to known locations of the one or more magnetic field sensors. The calculated angles may be relative to a fixed baseline defined by the known locations of the one or more magnetic field sensors. As another example, in an embodiment having three magnetic field sensors disposed at fixed positions, the processor may triangulate the position of the magnetic element as a function of variances in the sensed strength of the magnetic field emanating from the magnetic element.

In yet another embodiment, the system may include a flotation device joined with a magnetic element and that floats in proximity to a surface of the fluid held by a fluid reservoir. One or more magnetic field sensors may be disposed on or in proximity to a wall of the fluid reservoir, and may provide sensor output indicative of a magnetic field strength. The magnetic field strength may vary as a function of the position of the magnetic element with respect to the one or more magnetic field sensors. As an example, the one or more magnetic field sensors may include a plurality of magnetic field sensors disposed at different positions, and the magnetic field strength sensed by each on the magnetic field sensors may be different depending on the relative distance from the magnetic element.

In still another embodiment, movement of the flotation device may be substantially constrained to a single axis of travel by a flotation guide, such a rod or tube.

In even another embodiment, movement of the filtration device may be substantially random about the surface of the fluid held by the fluid reservoir.

In a further embodiment, the one or more magnetic field sensors may be disposed at various locations, including internally or externally, or a combination thereof, with respect to the fluid reservoir. As an example, the one or more magnetic field sensors may be disposed outside the fluid reservoir and the flotation device may be disposed inside the fluid reservoir, thereby avoiding placing electric circuitry of the sensor system within the fluid reservoir. Further, the magnetic field sensors may be disposed on a wall of the fluid reservoir or adjacent thereto.

In yet a further embodiment, the flotation device including the magnetic element may be constructed such that the flotation device self-orients while floating. For instance, the flotation device may be weighted such that, in floating in proximity to a surface of the fluid, the flotation device rights itself to substantially maintain a particular orientation with respect to a surface of the Earth or the gravitational acceleration vector of the Earth. As another example, the flotation device may be constructed to include a greater amount of buoyant composition distributed away from a center of mass of the flotation device so that the flotation device orients itself with respect to the surface of the fluid.

In still another embodiment, a method of determining a fluid level of fluid held by a fluid reservoir includes floating a magnetic element in proximity to the surface of the fluid. In one embodiment, the magnetic element may randomly float with respect to the surface. In another embodiment, the magnetic element may be constrained to movement along a single axis of travel.

The method according to this embodiment may include sensing first and second magnetic field strengths from respective first and second magnetic field sensors that are disposed at different positions. The first and second magnetic field strengths may respectively vary or change based on a relative position between the magnetic element and the first and second magnetic field sensors. Based on the sensed first and second magnetic field strengths, a position of the magnetic element may be determined and correlated to a fluid level of the fluid held by the fluid reservoir. Optionally, the fluid level of the fluid may be determined directly from the sensed first and second magnetic field strengths.

In even a further embodiment, a fluid level sensor system may determine a fluid level of fluid held by a reservoir based on information relating to sensed magnetic field strength from one or more locations. The sensed magnetic field strength may be different at each location and may vary based on a relative position or distance between each location and a magnetic element. The magnetic element may be coupled to a flotation device that floats the magnetic element in proximity to a surface of the fluid. With this configuration, the fluid level sensor system according to one embodiment may determine a fluid level without disposing circuitry or other electrical components into the fluid reservoir or in contact with the fluid. Further, in one embodiment, installation and operation of the fluid level sensor system can be simpler than conventional systems in that the flotation device can be dropped into the reservoir and can randomly float toward areas not readily accessible for measurement by conventional systems. For instance, the fluid level sensor system according to one embodiment can be configured to sense fluid level within differently shaped reservoirs, including reservoirs having narrow passages or volumes that conventional float arm-based fuel senders do not operate within. These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
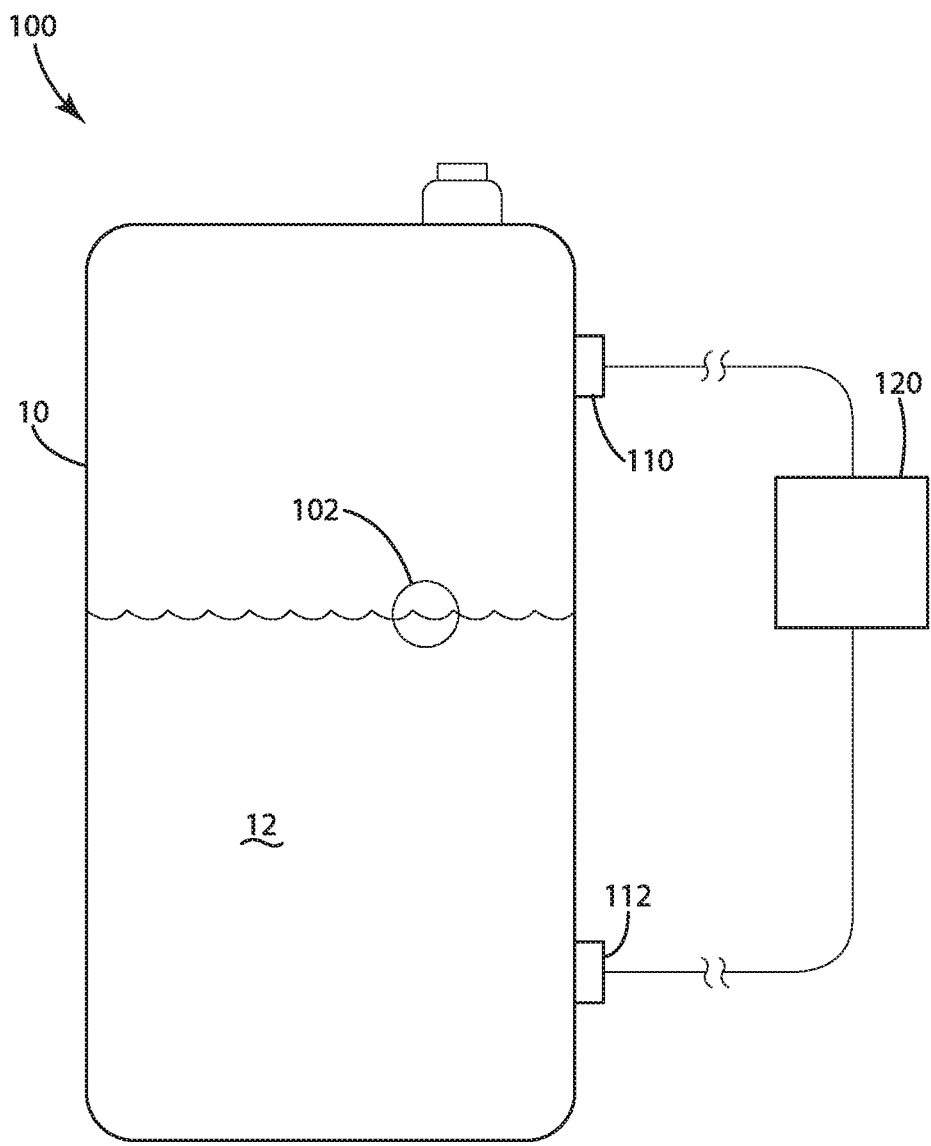
FIG. 1 shows a field-based fluid level sensor system according to a first embodiment associated with a fluid container.

A fluid level sensor system in accordance with one or more embodiments of the present disclosure is shown in FIG. 1, and generally designated 100. As set forth below, the fluid level sensor system 100 may include a flotation device 102 adapted to float within a container 10. The flotation device 102 is configured such that it is buoyant relative to a fluid 12 held by the container 10, thereby rising and falling with a surface of the fluid 12 being held by the container 10. In other words, the position of the flotation device 102 may be indicative of a fluid level of the fluid 12 being held by the container 10. The fluid level sensor system 100 may be configured to detect one or more positional parameters of the flotation device 102 relative to one or more magnetometer sensors 110, 112, and to determine a fluid level of the fluid 12 based on the one or more positional parameters. The positional parameters in one embodiment may include a precise spatial location of a magnetic element coupled to the flotation device 102.

The container 10 may be any type of tank or reservoir for holding fluid 12, including for example a fuel tank. Further, the container 10 may be sealed in some applications, and unsealed or open in other applications.

For purposes of disclosure, the fluid 12 within the container 10 is described at portions herein as being fuel within a fuel tank, but it should be understood that the present disclosure is not so limited and that any type of fluid may be held by the container 10 and that the fluid level sensor system 100 may be adapted to determine a fluid level of any fluid held by the container 10. Example applications include but are not limited to septic tanks, food processing tanks, farm ponds, sewer or water treatment plants, oil refineries, oil tank, cargo containers, ship holds, grill propane tanks, rural propane tanks, clinical tanks, chemical tanks, any liquid storage tank, ballasts for watercraft. Additional example applications include fat sacks (for boats), or any other type of dynamic tank or reservoir that can change in size or shape, or both. Further example applications include aviation fuel tanks at any location on the air craft, toilet bowl reservoirs, windshield fluid tanks, hot water tanks, water holding tanks (e.g., roof tops, natural rain water), coffee makers, portable restroom reservoirs, hazardous tanks, liquefied natural gas (LNG) tanks, liquid nitrogen storage, hydrogen storage, and urea storage.

The container 10 may be formed of any type of material, including nonmagnetic material or magnetic material, or a combination thereof. In principal, the material used for the container 10 may depend on the type of fluid 12 to be held by the container 10. For example, if the fluid 12 is a fuel that reacts to several types of materials, a non-reactive material with respect to the fluid 12 may be used for the container 10. In one embodiment, the container 10 may be formed primarily of nonmagnetic, plastic material such as polyethylene. The container 10 may be a substantially rigid such that the container substantially maintains its shape regardless of the amount of fluid being held. Alternatively, the container 10 may be soft such that the container 10 can expand or change shape, or both. For instance, the soft structure of the container 10 may enable expansion thereof such that an internal volume of the container 10 can increase to accommodate additional fluid.

The fluid level sensor system 100 according to one embodiment may be a fuel sender for use in conjunction with a vehicle. In this context, the fluid level sensor system 100 may provide a fuel sender output, such as an analog voltage output or a variable resistance output, that is indicative of a fluid level of the fluid 12 held by the container 10. This fuel sender output may be fed or provided to components of the vehicle, such as a fuel gauge.

For example, the fuel sender output of the fluid level sensor system 100 may have a resistance in a range of 240-30 ohms, where 240 ohms corresponds to an empty container and 30 ohms corresponds to a full container. The fuel gauge may be configured to indicate the fluid level based on the resistance of the fuel sender output. As fuel is consumed from the fuel tank by the vehicle engine, there is a decrease in height of the fluid 12 and the flotation device 102 relative to a bottom of the fuel tank. The fluid level sensor system 100 may be configured to determine a height of the flotation device 102 based on magnetic sensor output from the one or more magnetometers 110, 112, to determine a fluid level based on the determined height, and to vary the fuel sender output to correspond to the determined fluid level. In this example, as the fuel is consumed by the vehicle engine, the resistance of the fuel sender output increases. It should be understood that the fluid level sensor system 100 may provide any type of output indicative of a fluid level of fluid 12 held by the container 10, and that the present disclosure is not limited to any particular feature or aspect of the described example.

The flotation device 102 in the illustrated embodiment of FIG. 1 may include a magnetic element, such as a permanent magnet or magnetic material, such as ferromagnetic or paramagnetic material. One example of a magnetic material is iron, but any type of magnetic material may be used. In the illustrated embodiment, the magnetic element 108, itself, may not be buoyant relative to the fluid 12—however, the flotation device 102 may include a buoyant composition 109 that can overcome the weight of the magnetic element 108 such that the flotation device 102, including the magnetic element 108 and the buoyant composition 109, may be buoyant relative to the fluid 12.

Figure 6:
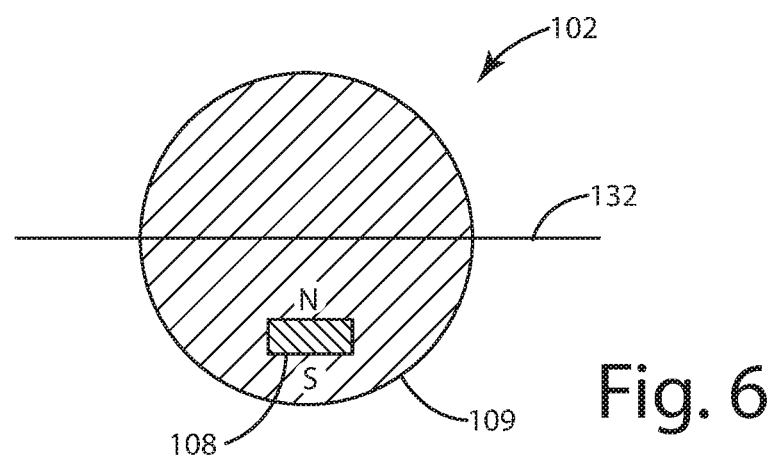
FIG. 6 shows a magnetic float according to the first embodiment.

An example of such a flotation device 102 is shown in a sectional view in the illustrated embodiment of FIG. 6. The flotation device 102 in the illustrated embodiment includes a magnetic element 108 and buoyant composition 109 that is arranged to hold the magnetic element 108. The buoyant composition 109 may encapsulate the magnetic element 108 as shown in the illustrated embodiment—but it should be understood that encapsulation is not a necessity. For example, rather than being encapsulated within the buoyant composition 109, the magnetic element 108 may be disposed on the buoyant composition 109. The buoyant composition 109 may include one or more voids to which a surface thereof may be joined with the magnetic element 108. Adhesive or a mechanical interlock, or any type of joining or fastening mechanism may be used to join the magnetic element 108 and the buoyant composition 109.

Optionally, the magnetic element 108 may not be joined with the buoyant composition 109—instead, the magnetic element 108 may be held within or constrained by the buoyant composition 109. For instance, the magnetic element 108 may be constrained within a void of the buoyant composition 109 such that the magnetic element 108 can freely move within the void. For example, the buoyant composition 109 may include a sealed, plastic shell that is filled with an inert gas and contains the magnetic element 108. In this way, the magnetic element 108 can freely move within the plastic shell, but because the density of the magnetic element 108 is greater than the inert gas, the magnetic element 108 may orient itself within the plastic shell such that the magnetic element 108 accelerates or lies along the gravitational acceleration vector of the Earth.

In the illustrated embodiment, the magnetic element 108 may be disposed off center relative to a central axis 132 of the flotation device 102 so that the weight or density distribution of the flotation device 102 is asymmetrical. In this way, the flotation device 102 may be self-orienting. As can be seen in the illustrated embodiment of FIG. 6, the magnetic element 108 includes North and South poles (N-S). Because the flotation device 102 is configured to self-orient on the surface of the fluid 12, the magnetic element 108 may be disposed such that the N-S poles are aligned normal or perpendicular to a surface of the fluid 12.

In the illustrated embodiment, the buoyant composition 109 may be a non-reactive composition that does not react to the fluid 12 held by the container 10, and may be less dense than the fluid 12 such that the flotation device 102 floats in proximity to a surface of the fluid 12. The buoyant composition 109 may be comprised of a plurality of compositions that together achieve buoyancy of the flotation device 102 relative to the fluid 12. As an example, the buoyant composition 109 may include plastic having one or more voids that are filled with another composition, such as a gas. Examples of gases that may facilitate buoyancy include air, nitrogen, or inert gas.

The flotation device 102 may be sized and configured so that it can be easily installed within the container 10. In one embodiment, the flotation device 102 may be "dropped" or otherwise disposed in the container 10 through an opening of the container 10 (e.g., the fill opening) during manufacture. In an alternative embodiment, the flotation device 102 may be larger than a fill opening of the container 10, but may be disposed within the container 10 at manufacture by placing the flotation device 102 in the container 10 during formation of the container 10 and prior to one or more openings of the container 10 being too small or sealed to prevent placement of the flotation device 102. With this configuration, it may not be possible to remove the flotation device 102 from the container 10 without disassembling the container 10. In one embodiment, during manufacture of the container 10, the flotation device 102 may be installed within the container 10 and adhered to an inner wall of the container 10 using a fluid dissolvable adhesive. This way, the adhesive may prevent the flotation device 102 from freely moving within the container 10 during shipment and prior to the container 10 being filled with the fluid 12.

The fluid level sensor system 100 may include one or more magnetic field sensors 110, 112, such as magnetometer sensors as mentioned herein. In the illustrated embodiment of FIG. 1, the one or more magnetic field sensors include a first magnetic field sensor 110 and a second magnetic field sensor 112. The one or more magnetic field sensors 110, 112 may be any type of magnetic field sensor capable of sensing a magnetic field strength (e.g., a Gauss value) along one or more axes or varying an output based on strength of the magnetic field. In the illustrated embodiment, the one or more magnetic field sensors 110, 112 may be 3-axis magnetometers configured to sense a magnetic field strength along 3-orthogonal axes (X, Y, and Z), and may utilize a magneto resistive type sensor formed as an integrated circuit. The type of magnetic field sensor 110, 112 is not limited to a magnetic resistive type sensor. Any type of magnetic field sensor may be utilized, including, for example, a magnetic inductive sensor. The one or more magnetic field sensors 110, 112 may be disposed on or in proximity to a container wall of the container 10. Further, the one or more magnetic field sensors 110, 112 may be positioned inside the container 10 or outside the container 10, or a combination thereof.

A variety of factors may affect the sensed magnetic field strength, including the strength of the Earth's magnetic field at a particular latitude and longitude, deviations in the Earth's magnetic field potentially due to proximity to a ferromagnetic or magnetic material, and a position of the flotation device 102 relative to the magnetometer. The one or more magnetic field sensors 110, 112 may provide one or more outputs indicative of the magnetic field strength along the one or more axes. As an example, the one or more magnetic field sensors 110, 112 may provide a digital communication interface, such as an I2C interface, through which a separate controller or sensor circuitry 120 can obtain digital information relating to a magnetic field strength along the one or more axes. As another example, the one or more magnetic field sensors 110, 112 may provide one or more analog outputs whose output voltage range corresponds to a range of magnetic field strength. The one or more analog outputs can be sensed and converted via an analog-to-digital converter to a digital value representative of the magnetic field strength.

The fluid level sensor system 100 as described herein may include sensor circuitry 120 operably coupled to the one or more magnetic field sensors 110, 112 to obtain sensor information relating to a magnetic field strength along one or more axes. The sensor circuitry 120 may include a controller or microprocessor and memory with instructions to direct the microprocessor to calculate a fluid level based on the sensor information obtained from the one or more magnetometer sensors 110, 112.

In one embodiment, because the flotation device 102 includes a magnetic material 109, a strength of the magnetic field sensed by the one or more magnetic field sensors 110, 112 may change as the flotation device 102 moves relative to the one or more magnetic field sensors 110, 112. In other words, a magnetic field strength along one or more axes sensed by the first magnetic field sensor 110 may depend on a position of the flotation device 102 relative to the first magnetic field sensor 110. Likewise, a magnetic field strength along one or more axes sensed by the second magnetic field sensor 112 may depend on a position of the flotation device 102 relative to the second magnetic field sensor 112. The sensor circuitry 120 may obtain sensed information from the first and second magnetic field sensors 110, 112 that relates to magnetic field strength sensed by the respective magnetic field sensor, and determine a fluid level of the fluid 12 held by the container 10 based on the sensed information.

In the illustrated embodiment, a plurality of magnetic field sensors 110, 112 may be disposed on or in proximity to the container 10 at different positions. For instance, the first magnetic field sensor 110 may be disposed near a full level, and the second magnetic field sensor 112 may be disposed near an empty level of the container 10. Because the flotation device 102 can float within the container 10 and rises and falls with a fluid level of the fluid 12, and because the plurality of magnetic field sensors 110, 112 are disposed of different positions, a magnetic field strength sensed by one magnetic field sensor may be different from a magnetic field strength sensed by another magnetic field sensor. The sensor circuitry 120 may analyze these different sensed magnetic field strengths to determine a position of the flotation device 102 with respect to the plurality of magnetometer sensors 110, 112. In one embodiment, the sensor circuitry 120 may utilize triangulation techniques based on the relative strength of the sensed magnetic fields to determine the position of the flotation device 102.

The sensor circuitry 120 in one embodiment may include a controller or a microprocessor and memory that stores instructions to determine a fluid level of the fluid 12 held by the container 10 based on sensed magnetic field strength information. In one embodiment, as described above, the sensed magnetic field strength information may be obtained from a plurality of magnetic field sensors, each disposed at different positions, such that the relative sensed magnetic strength measured by the plurality of magnetic field sensors is indicative of a position of the flotation device 102 within the container 10.

Figure 2:
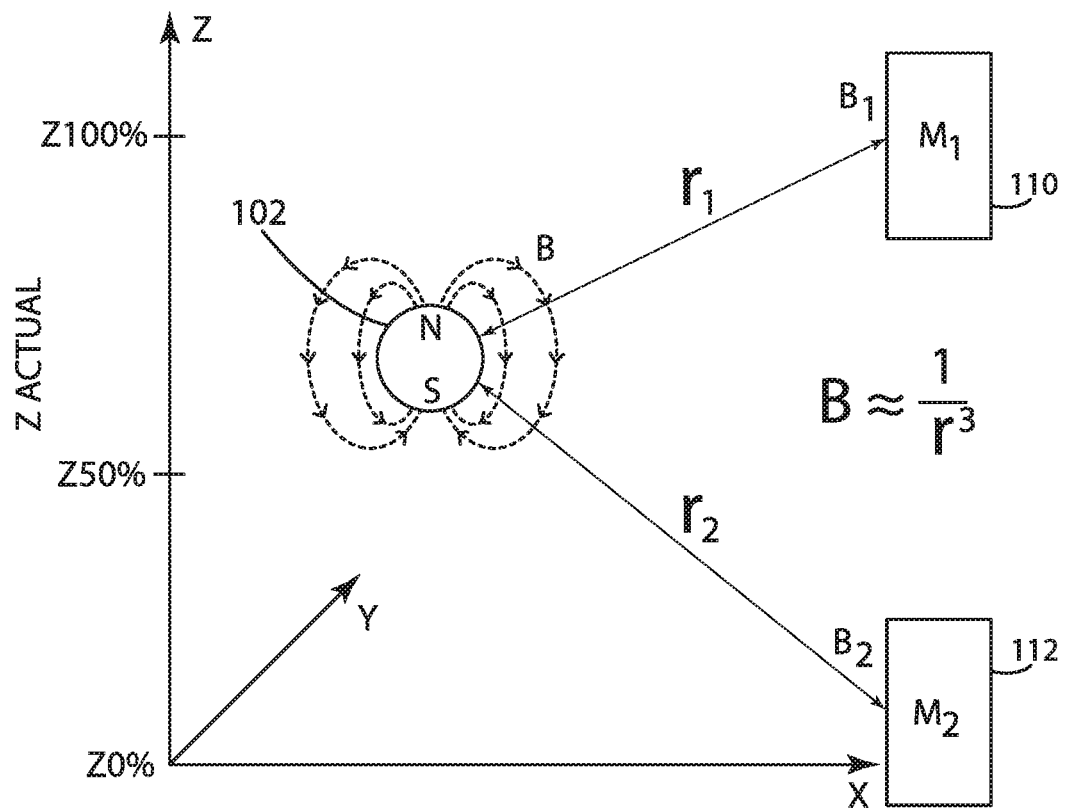
FIG. 2 depicts a representative view of the fluid level sensor system according to the first embodiment.
Figure 3:
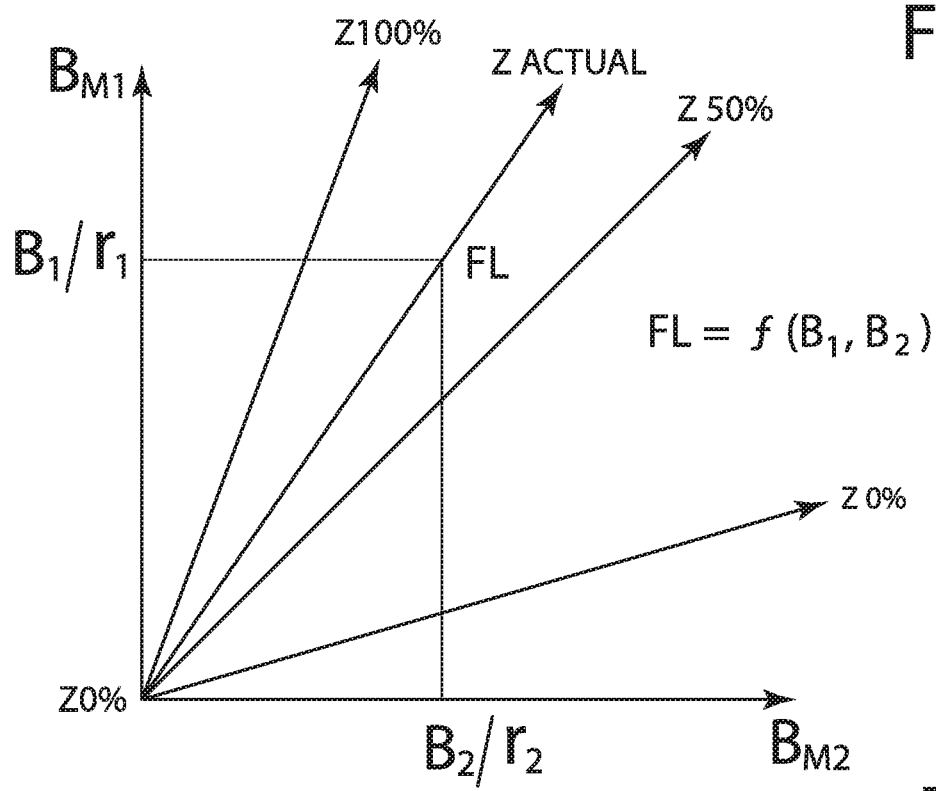
FIG. 3 shows a representative graph of the functional relationship between magnetic field strength and a level of fluid in the fluid container according to the first embodiment.

In the illustrated embodiment of FIGS. 2 and 3, functional relationships among magnetic field strength, position of a magnetic field sensor, and position of the flotation device 102 are shown in relation to a fluid level of fluid 12 held by the container 10. For purposes of disclosure, in the illustrated embodiment, the flotation device 102 includes a permanent magnet 108 that emanates a magnetic field B and is oriented with its N-S poles aligned with the gravitational acceleration vector of the Earth, which is depicted as the Z-axis in FIG. 2. The level of the fluid 12 held by the container 10 also corresponds to a position along the Z-axis in FIG. 2. While floating on the surface of the fluid 12, the flotation device 102 can move freely in along the X and Y axes depicted in FIG. 2, and can rise and fall with the level of the fluid 12 along the Z-axis. It should be understood that the X, Y, and Z axes could be oriented differently, but have been chosen as shown in FIG. 2 to facilitate discussion.

The magnetic field B emanating from the flotation device 102 may vary in strength as a function of distance. More specifically, the strength of the magnetic field B may be approximately $1/r^3$, where r is a distance from the flotation device 102. It should be understood there are several other factors that can affect magnetic field strength at a measurement point or location relative to the flotation device 102, including, for example, orientation of the magnetic element 108 (or its principal N-S vector) relative to a point of measurement that can affect a measured strength of the magnetic field B. The physical dimensions of the magnetic element 108 may also affect the measured strength of the magnetic field B at a measurement location or point. These factors among others can affect a measured strength of a magnetic field at a point or location relative to the magnetic element 108 of the flotation device 102. However, for purposes of disclosure, the strength of the magnetic field can be approximated as $1/r^3$.

In the illustrated embodiment of FIGS. 2 and 3, the flotation device 102 is depicted at a Z-axis position corresponding to a fluid level between full (or 100% full) and half-full (or 50% full). The magnetic field sensors 110, 112 are disposed respectively near the full and empty positions. As a result, as can be seen, a distance r2 between the first magnetic field sensor 110 and the flotation device 102 is smaller than a distance r2 between the second magnetic field 112 and the flotation device 102. The measured magnetic field strength B1 in proximity to the first magnetic field sensor 110 is therefore likely to be greater than the measured magnetic field strength B2 in proximity to the second magnetic field sensor 112. Based on the measured magnetic field strengths B1, B2, the sensor circuitry 120 may calculate a fluid level of the fluid 12 corresponding to the Z-axis position of the flotation device 102. More particularly, the sensor circuitry 120 may determine the fluid level as a function of the measured magnetic field strengths B1, B2 according to some function F. In one embodiment, the first magnetic field sensor 110 may be positioned at or near the full Z-axis position, and the second magnetic field sensor 112 may be positioned at or near the empty Z-axis position. The sensor circuitry 120 may determine fluid level based on the difference between a) the sensed magnetic field strength of the first magnetic field sensor 110 and b) the sensed magnetic field strength of the second magnetic field sensor 112. The functional relationship between fluid level or Z-axis position and the sensed magnetic field strengths may be linear and calculated, for example, based on the difference in sensed magnetic field strength between the "empty" sensor and the "full" sensor. The Z-axis difference may be factored out because the distance to three points are determined or known: 1) the determined distance between the magnet and the empty sensor, 2) the determined distance between the magnet and the full sensor and 3) the known distance between the empty sensor and the full sensor.

In the illustrated embodiment, because the flotation device 102 is allowed to float along the surface of the fluid 12, the flotation device 102 may move freely in an X-Y plane or along the X-axis and the Y-axis. This free movement may cause variations in the magnetic field strength measured by the first and second magnetometers 110, 112. In other words, as the flotation device 12 floats freely in a direction toward or closer to the first magnetic field sensor 110, the measured magnetic field strength B1 may increase. And, likewise, as the flotation device 102 floats freely in a direction farther from the first magnetic field sensor 110, the measured magnetic field strength B1 may decrease. The same can be said for the measured magnetic field strength B2 sensed by the second magnetic field sensor 112.

Although the flotation device 102 may move freely along the X and Y axes, the Z-axis position of the flotation device 102 may be substantially stable or constant (assuming no changes in actual fluid level and no changes in orientation of the container 10 relative to the gravitational acceleration vector of the Earth. In other words, the position of the flotation device 12 corresponding to a fluid level may be substantially constant in a stable environment. As mentioned herein, movement of the flotation device 12 in an X-Y plane or along the X and Y axes may correspond to a change in the respective distances r1, r2 between the first and second magnetometer sensors 110, 112 and the flotation device 12. However, in the illustrated embodiment, there is a functional relationship between the distances r1, r2 and the Z-axis position or a fluid level such that the sensor circuitry 120 can determine a fluid level or Z-axis position based on an indication of the distances r1, r2.

The respective distances r1, r2 between the one or more magnetometer sensors 110, 112 and the flotation device 102 may not be directly measurable, but in the illustrated embodiment, information relating to these distances may be determined based on the measured magnetic field strengths B1, B2. Based on the measured magnetic field strengths B1, B2 obtained from the one or more magnetic field sensors 110, 112, the sensor circuitry 120 may determine the fluid level or Z-axis position of the flotation device 102 in the container 10. The functional relationship between the measured magnetic field strength B1, B2 may yield information relating to the distances r1, r2 and therefore the Z-axis position of flotation device 102.

In the illustrated embodiment of FIG. 3, a functional relationship between the magnetic field strength B1, B2 and fluid level or Z-axis position is shown. For purposes of disclosure, the functional relationship is depicted as being generally linear; however, it should be understood that the functional relationship may not be linear. For instance, the functional relationship may be parabolic or exponential. It should also be understood that the functional aspects used to determine the Z-axis position of the flotation device 102 may be based on additional parameters, including measured parameters or predetermined parameters or a combination thereof. In embodiments in which there are more than two measured magnetic field strengths obtained from more than two magnetometer sensors, the functional relationship may be represented by a corresponding number of dimensions.

The Z-axis position of the flotation device 102, in the illustrated embodiment of FIG. 3, may functionally correspond to the ratio between (a) the magnetic field strength B1 measured by the first magnetic field sensor 110 and (b) the magnetic field strength B2 measured by the second magnetic field sensor 112. For instance, at the Z-axis position corresponding to Z_Actual, the ratio between the magnetic field strengths B1, B2 may follow a linear relationship despite changes in strength due to position changes along the X axis and the Y axis, or both. As the flotation device 102 moves farther away from both the first and second magnetometer sensors 110, 112, the measured magnetic field strengths B1, B2 may decrease in a corresponding manner—however, as shown in FIG. 3, the ratio between the measured magnetic field strengths B1, B2 and the Z-axis position may follow a linear relationship along the line labeled Z_Actual. As a result, the sensor circuitry 120 may obtain the measured magnetic field strength B1, B2 from the first and second magnetic field sensors 110, 112, and calculate the Z-axis position or fluid level as a function of the measured magnetic field strengths B1, B2. If the Z-axis position changes, similar functional relationships based on the measured magnetic field strengths B1, B2 may be implemented to determine the Z-axis position change, including, for example, those shown and labeled as $Z_{100\%}$, $Z_{50\%}$ and $Z_{0\%}$ in FIG. 3.

In some applications, the container 10 may be in motion and may not remain static. Vehicle applications, such as cars or watersports, are examples of such non-static applications. As a result, the fluid 12 held by the container 10 may be in motion, and the float 12 may also be in motion. This type of motion may be considered unrelated to the actual fluid level of the fluid 12 held by the container 10, but may affect or cause variations in the sensed magnetic field strength of the one or more magnetic field sensors 110, 112. Filtering of the sensed magnetic field strength may be implemented to substantially remove or prevent sensor variations unrelated to changes in the fluid level from affecting the determined fluid level of the fluid level sensor system 100. Kulman filtering is one example of a filter technique that may be in conjunction with preventing unrelated motion from affecting the calculated fluid level.

Figure 4:
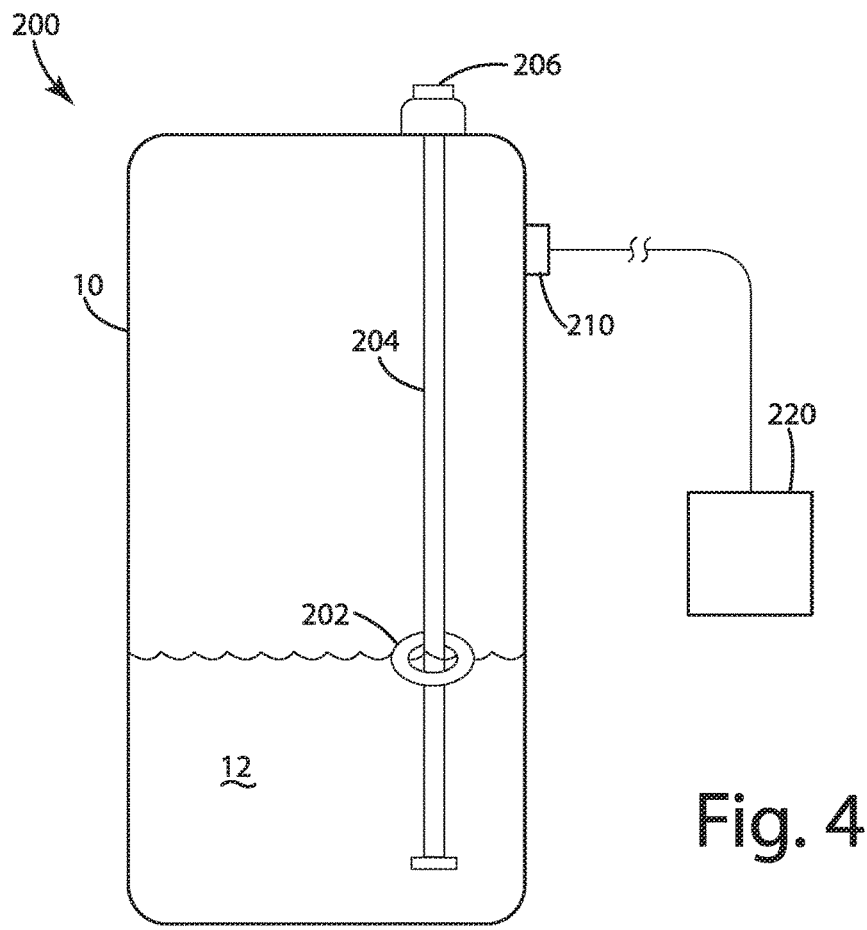
FIG. 4 shows a field-based fluid level sensor system according to a second embodiment arranged conjunction with the fluid container.

A fluid level sensor system in accordance with one embodiment of the present disclosure is shown in FIG. 4, and generally designated 200. The fluid level sensor system 200 may be similar to the fluid level sensor system 100 described herein, but with several exceptions. For example, the fluid level sensor system 200 may include a flotation device 202, a magnetic field sensor 210, and sensor circuitry 220 similar in some respects to the flotation device 102, the one or more magnetic field sensors 110, 112, and the sensor circuitry 120 described in connection with the fluid level sensor system 100. In the illustrated embodiment, the fluid level sensor system 200 may be configured such that the flotation device 202 is constrained by a flotation guide 204 to travel substantially along a single axis. A position of the flotation device 202 along this single axis may correspond to a fluid level of the fluid 12 held by the container 10.

The single axis of travel in the illustrated embodiment of FIG. 4 may be aligned with a longitudinal axis of the flotation guide 204, along which the flotation device 202 may travel. In the illustrated embodiment, the flotation guide 204 may be in the form of a rod or tube disposed through an aperture of the flotation device 202. This rod configuration of the flotation guide 202 may enable the flotation device 202 to freely move along the longitudinal axis of the flotation guide 202, or to freely rise and fall with the fluid level of the fluid 12 held by the container 10. In one embodiment, the flotation guide 202 may be coupled to a container cap 206 that enables insertion of the flotation guide 202 through an aperture into the container 10 and configured to seal the aperture to prevent the fluid 12 from exiting through the aperture. In one embodiment, a magnetic field sensor may be coupled to a cap of the fluid reservoir.

Figure 5:
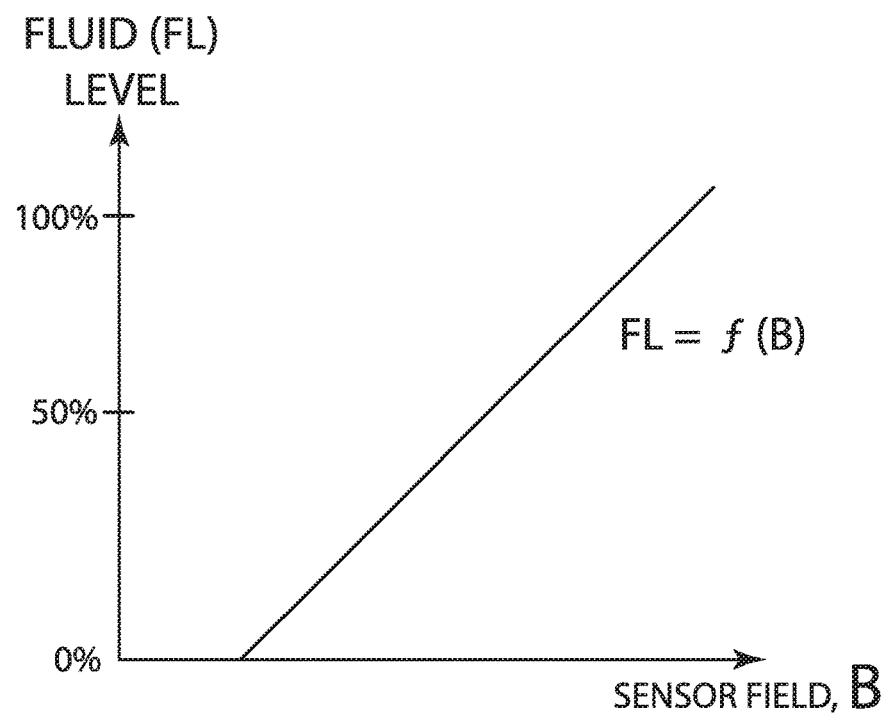
FIG. 5 shows a representative graph of the functional relationship between magnetic field strength and a level of fluid in the container according to the second embodiment.

Because the flotation device 202 may be constrained to movement in substantially a single axis, the functional relationship utilized by the sensor circuitry 220 may be configured to determine a fluid level based on a sensed magnetic strength from a single magnetic field sensor—although it should be understood the present disclosure, including the fluid level sensor system 200, is not limited to use of a single magnetic field sensor. In other words, in the illustrated embodiment of FIG. 5, a plurality of magnetometer sensors may be disposed at different positions, similar to the fluid level sensor system 100. The fluid level sensor system 200 may obtain and analyze the sensed magnetic field strengths from the plurality of magnetic field sensors to determine a fluid level.

In the illustrated embodiment, the sensor circuitry 220 may determine fluid level based on a functional relationship between (a) a position of the flotation device 202 that corresponds to a fluid level and (b) sensor output from the magnetic field sensor 210. For example, the fluid level of the fluid 12 held by the container 10 may functionally correspond to a measured magnetic field strength B of a single magnetic field sensor 210. With the magnetic field sensor 210 being positioned in proximity to a full level, and with the flotation device 202 being constrained to movement that is substantially linear or along a single axis, the stronger the measured magnetic field strength B, the closer the flotation device 202 is to the magnetic field sensor 210. The weaker the magnetic field strength B, the farther the flotation device 202 is from the magnetic field sensor 210. Weakening of the magnetic field strength B may be indicative of the flotation device 202 may be falling or moving away from the magnetic field sensor 210.

The flotation device 202, as discussed herein, may be configured in a variety ways. In the illustrated embodiment, the flotation device 202 may include an aperture through which the flotation guide 204 may be disposed. The flotation device 202, like the flotation device 102, may include a magnetic element and a buoyant composition.

Figure 8:
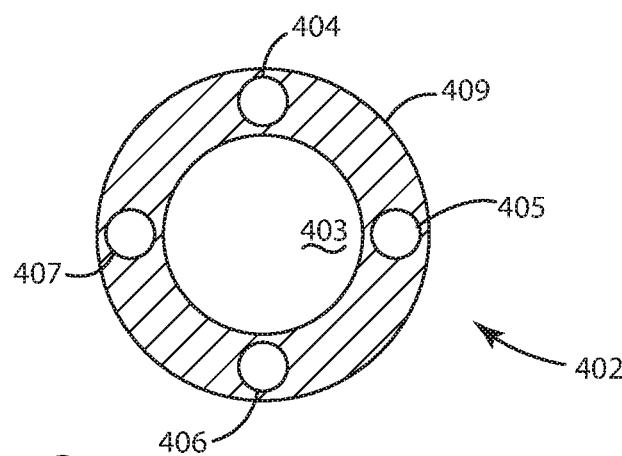
FIG. 8 shows a magnetic flow according to a fourth embodiment.

An example embodiment of a flotation device similar to the flotation device 202 is shown in FIG. 8, and generally designated 402. The flotation device 402 may be similar to the flotation device 202, and includes an aperture 403. The flotation device 402 may also include buoyant material 409 similar to the buoyant material 109 described in connection with the flotation device 102. The aperture 403 of the flotation device 402, when used in conjunction with a rod-type flotation guide, may allow the flotation device 402 to spin or rotate about the flotation guide. This spin or free rotation may result from sufficient clearance existing between the flotation guide and the flotation device 402 such that the flotation device 402 can freely move along a longitudinal axis of the flotation guide. In one embodiment, the flotation device may interlock with a portion of the flotation guide along the longitudinal length thereof such that free spin or rotation is substantially prevented.

In the illustrated embodiment of FIG. 8, the flotation device 402 may include a plurality of magnetic element 404, 405, 406, 407 disposed about a center of the flotation device 402 in a manner that is substantially uniform. In this way, as the flotation device 402 freely spends or freely rotate about the flotation guide, a magnetic field strength emanating from the plurality of magnetic element 404, 405, 406, 407 may appear to be substantially the same from the perspective of the magnetometer sensor 210.

Figure 7:
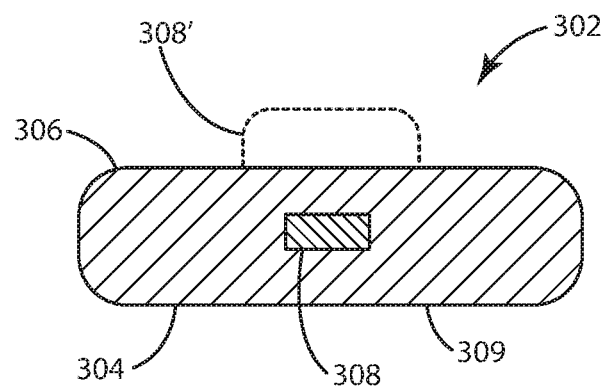
FIG. 7 shows a magnetic flow according to a third embodiment.

An alternative embodiment of a flotation device is shown in FIG. 7, and generally designated 302. The flotation device 302 may be similar to the flotation device 102, including a magnetic element 308 and buoyant composition 309. The distribution of the buoyant material 309 in the flotation device 302 may aid in maintaining alignment of the flotation device 302. For instance, in the illustrated embodiment, a principal component of the buoyant composition 309 may be distributed away from a center of the flotation device 302 (e.g., a center of mass), thereby causing first or second primary flotation surfaces 304, 306 to be oriented with respect to a surface of the fluid 12. In this way, the magnet element 308 may be aligned in a particular manner relative to a surface of the fluid 12 or the Earth. As an example, in the case of the magnetic element 308 being a permanent magnet with a N-S pole, the magnetic element 308 may be positioned within the buoyant composition 309 such that the N-S pole is aligned with the surface of the fluid 12—though the N-S pole may be up or down in this configuration.

Optionally, the magnetic element may be disposed on a surface of the buoyant composition 309, as shown in broken lines in the illustrated embodiment of FIG. 7, and generally designated 308'. The magnetic element 308' may be affixed to the buoyant composition 309 during manufacture, facilitating production of the buoyant composition 309 separate from the magnetic element 308'.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A fluid sensor system for fluid held by a fluid reservoir system, the fluid reservoir system having a cap assembly for closing an opening of fluid reservoir system, said fluid sensor system comprising:
   a floatation device having a magnetic element, said floatation device configured to float in proximity to a surface of the fluid in the fluid reservoir system, wherein said floatation device is buoyant with respect to the fluid;
   a magnetic field sensor configured to sense a magnetic field strength, said magnetic field sensor disposed on the cap assembly or a position corresponding to a substantially empty condition for the fluid reservoir system, said magnetic field sensor configured to provide a sensor output indicative of said sensed magnetic field strength, wherein said magnetic field strength varies as a function of a position of said magnetic element with respect to said magnetic field sensor, wherein said position of said magnetic element corresponds to a fluid level of the fluid that is held by the fluid reservoir system; and
   sensor circuitry operably coupled to said magnetic field sensor, said sensor circuitry capable of obtaining said sensor output from said magnetic field sensor, said sensor circuitry including a processor configured to determine a fluid level of the fluid based on said sensor output indicative of said sensed magnetic field strength, said processor configured to generate an output signal based on said fluid level.

2. The fluid sensor system of claim 1 comprising a floatation guide provided within the fluid reservoir system, wherein said floatation device is allowed to move along a longitudinal axis of said floatation guide.

3. The fluid sensor system of claim 2 wherein said floatation guide is coupled to the cap assembly, and wherein said magnetic field sensor is coupled to a cap of the cap assembly.

4. The fluid sensor system of claim 1 comprising a plurality of magnetic field sensors, wherein each of said plurality of magnetic field sensors is configured to simultaneously sense said magnetic field strength and generate sensor output indicative of said sensed magnetic field strength, and wherein said processor is configured to determine the fluid level of the fluid based on sensor output from each of said plurality of magnetic field sensors.

5. The fluid sensor system of claim 4 wherein said plurality of magnetic field sensors are disposed at different locations such that said magnetic field strength that is sensed by said each magnetic field sensor of said plurality of magnetic field sensors is different.

6. The fluid sensor system of claim 1 wherein said processor is configured to determine said fluid level based on a value of said sensed magnetic field strength indicated by said sensor output from said magnetic field sensor.

7. The fluid sensor system of claim 6 wherein said processor is configured to determine said position of said floatation device relative to said magnetic field sensor based on said value of said sensed magnetic field strength indicated by said sensor output from said magnetic field sensor.

8. The fluid sensor system of claim 1 wherein said output signal is indicative of a volume of the fluid that is held by the fluid reservoir system, and wherein said magnetic field sensor is the only sensor operable to provide sensor output indicative of a magnetic field strength and a fluid level of the fluid held by the fluid reservoir system.

9. A fluid sensor system for fluid held by a fluid reservoir system, the fluid reservoir system having a cap assembly for closing an opening of the fluid reservoir system, said fluid sensor system comprising:
   a floatation device having a magnetic element, said floatation device configured to float in proximity to a surface of the fluid, wherein said floatation device is buoyant with respect to the fluid;
   a magnetic field sensor configured to sense a magnetic field strength, said magnetic field sensor disposed on the cap assembly or a bottom of the fluid reservoir system, said magnetic field sensor configured to provide sensor output indicative of said sensed magnetic field strength, wherein said sensed magnetic field strength varies as a function of a position of said magnetic element with respect to said magnetic field sensor, wherein said position of said magnetic element corresponds to a fluid level of the fluid that is held by the fluid reservoir system; and
   sensor circuitry operably coupled to said magnetic field sensor, said sensor circuitry capable of obtaining said sensor output from said magnetic field sensor, said sensor circuitry including a processor configured to determine the fluid level of the fluid based on said sensor output indicative of said sensed magnetic field strength.

10. The fluid sensor system of claim 9 comprising a floatation guide provided within the fluid reservoir system, wherein said floatation device is allowed to move along a longitudinal axis of said floatation guide.

11. The fluid sensor system of claim 10 wherein said floatation guide is configured to substantially constrain movement of said floatation device to a single axis of travel.

12. The fluid sensor system of claim 11 wherein said floatation guide is a rod, and wherein said floatation device includes an aperture through which said rod is disposed such that said floatation device travels along said rod.

13. The fluid sensor system of claim 9 wherein said magnetic field sensor is disposed at or near a full level of the fluid reservoir system, and wherein said magnetic field sensor is coupled to a cap of the cap assembly.

14. The fluid sensor system of claim 9 wherein said sensor circuitry is operable to generate an output signal based on said fluid level, wherein said output signal is indicative of a volume of the fluid held by the fluid reservoir system, and wherein the magnetic field sensor is the only sensor operable to provide sensor output indicative of a magnetic field strength and a fluid level of the fluid held by the fluid reservoir system.

15. The fluid sensor system of claim 9 wherein said fluid reservoir system is a container formed polymeric material.

16. The fluid sensor system of claim 9 wherein said fluid reservoir system is a container formed of a magnetic material.

17. A method of determining a fluid level of a fluid that is held by a fluid reservoir system, said method comprising:
providing a magnetic field sensor on a cap assembly of the fluid reservoir system or a position corresponding to a substantially empty condition for the fluid reservoir system;
floating a magnetic element in proximity to a surface of the fluid, wherein a position of the magnetic element is indicative of the fluid level;
sensing, with the magnetic field sensor, a magnetic field strength, wherein the magnetic field strength varies based on the position of the magnetic element relative to the magnetic field sensor;
generating, in the magnetic field sensor, a sensor output indicating the magnetic field strength; and
determining the fluid level of the fluid based on the sensor output indicating the sensed magnetic field.

18. The method of claim 17 comprising:
sensing a secondary magnetic field strength with a secondary magnetic field sensor, wherein the magnetic field strength varies based on the position of the magnetic element relative to the secondary magnetic field sensor; and
sensing the magnetic field strength and the secondary magnetic field strength at substantially the same time.

19. The method of claim 18 comprising processing signals output from the magnetic field sensor and the secondary magnetic field sensor, wherein the signals are indicative of the sensed magnetic field strength and the secondary magnetic field strength.

20. The method of claim 19 comprising:
providing a floatation guide; and
influencing, with the floatation guide, a path of motion of the magnetic element, wherein said influencing includes guiding the magnetic element to travel along a longitudinal axis of the floatation guide in response to changes in a level of the fluid in the fluid reservoir system.

* * * * *